April 30, 1957 W. RHOTEN 2,790,251

SELF-TEACHING DEVICE

Filed Sept. 8, 1953 5 Sheets-Sheet 1

INVENTOR.
WESLEY RHOTEN
BY
J. Warren Kinney, Jr.
ATTORNEY

April 30, 1957 W. RHOTEN 2,790,251

SELF-TEACHING DEVICE

Filed Sept. 8, 1953 5 Sheets-Sheet 2

INVENTOR.
WESLEY RHOTEN
BY
J. Warren Kinney, Jr.
ATTORNEY

April 30, 1957 W. RHOTEN 2,790,251

SELF-TEACHING DEVICE

Filed Sept. 8, 1953 5 Sheets-Sheet 3

INVENTOR.
WESLEY RHOTEN
BY J. Warren Kinney, Jr.
ATTORNEY

April 30, 1957 W. RHOTEN 2,790,251

SELF-TEACHING DEVICE

Filed Sept. 8, 1953 5 Sheets-Sheet 4

INVENTOR.
WESLEY RHOTEN
BY
J. Warren Kinney, Jr.
ATTORNEY

INVENTOR.
WESLEY RHOTEN
BY
J. Warren Kinney, Jr.
ATTORNEY

United States Patent Office 2,790,251

Patented Apr. 30, 1957

2,790,251

SELF-TEACHING DEVICE

Wesley Rhoten, Miamiville, Ohio

Application September 8, 1953, Serial No. 378,749

2 Claims. (Cl. 35—9)

This invention relates to a calculator, and more particularly to a simple, highly efficient device for indicating the sum and difference of certain numbers, or for indicating the product thereof.

An object of the invention is to provide a simple, inexpensive calculator which includes a rotatable disk concealed beneath an upper panel provided with a window opening, through which the numbers to be added, subtracted or multiplied are visible, said upper panel including a row of apertures, one for each different digit, said apertures adapted to be selectively aligned with an aperture in the rotatable disk for enabling a conductor probe to be inserted through the aligned apertures for thereby completing an electric circuit to suitable indicating means.

Another object of the invention is to provide a calculator having electrically actuated indicator means which are adapted to be energized only during those periods of time when a conductor probe has been inserted through aligned apertures of an upper panel and a rotatable disk, immediately therebelow. The relationship of the apertures through the rotatable disk are correlated with groups of numerals around the outer periphery of the disk, whereby the sum, difference or product of any particular group of numerals will be indicated by the alignment of one or more of the apertures of the disk with one or more of the apertures of the upper panel.

Still a further object of the invention is to provide a multiplication calculator wherein the product of two numbers is indicated by means of two axially aligned sets of apertures through an upper panel, wherein one set of apertures corresponds to the "ones" of a multiplication table and wherein the other group of apertures corresponds to the "tens" of a multiplication table.

Still a further object of the invention is to provide a calculator having the hereinabove described characteristics, and which includes an electrically actuated indicator means in the form of a compact, tubular housing containing a source of electrical energy, one end of said housing provided with a source of light or sound, the other end of the housing having a conductor probe projecting therefrom, said probe dimensioned to be inserted in the vertically aligned apertures of the upper panel and the rotatable disk disposed thereunder.

Still another objeect of the invention is to provide novel means for controlling the alignment of apertures in the upper panel with respect to the apertures in the rotatable disk whereby only those apertures will be aligned which will indicate the sum, difference or product of a particular pair of digits appearing on the disk when they are disposed in alignment with a window opening in the upper panel.

These and other objects are attained by the means described herein and as disclosed in the accompanying drawings, in which:

Fig. 5 is a sectional view taken on line 5—5 of Fig. 1.

Figure 1:
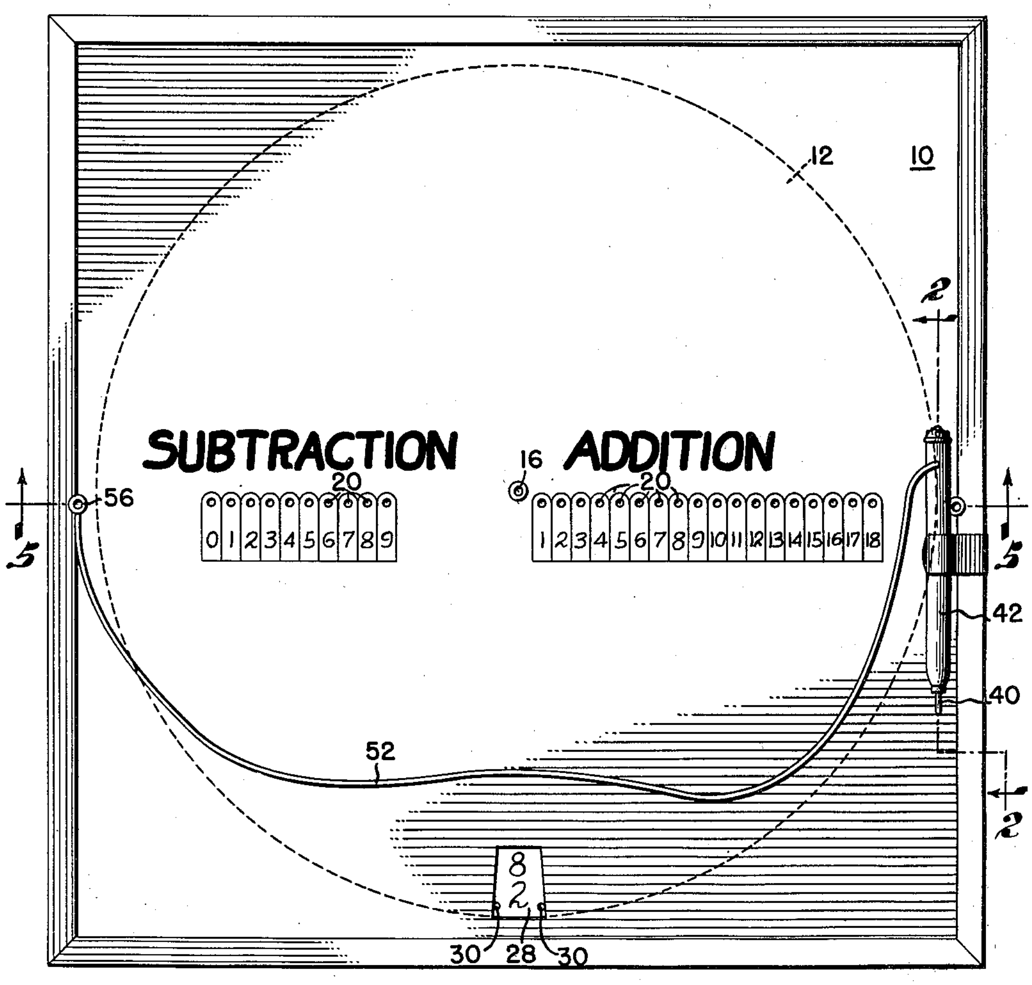
Fig. 1 is a top plan view illustrating my calculator adapted for addition and subtraction of a pair of digits.

With particular reference now to the drawings, the numeral 10 denotes an upper panel, the numeral 12 a rotatable disk and the numeral 14 a lower or base panel. Disk 12 is rotatably journaled about a center 16 which may, if desired, extend through the upper and lower panels 10 and 14.

Figure 6:
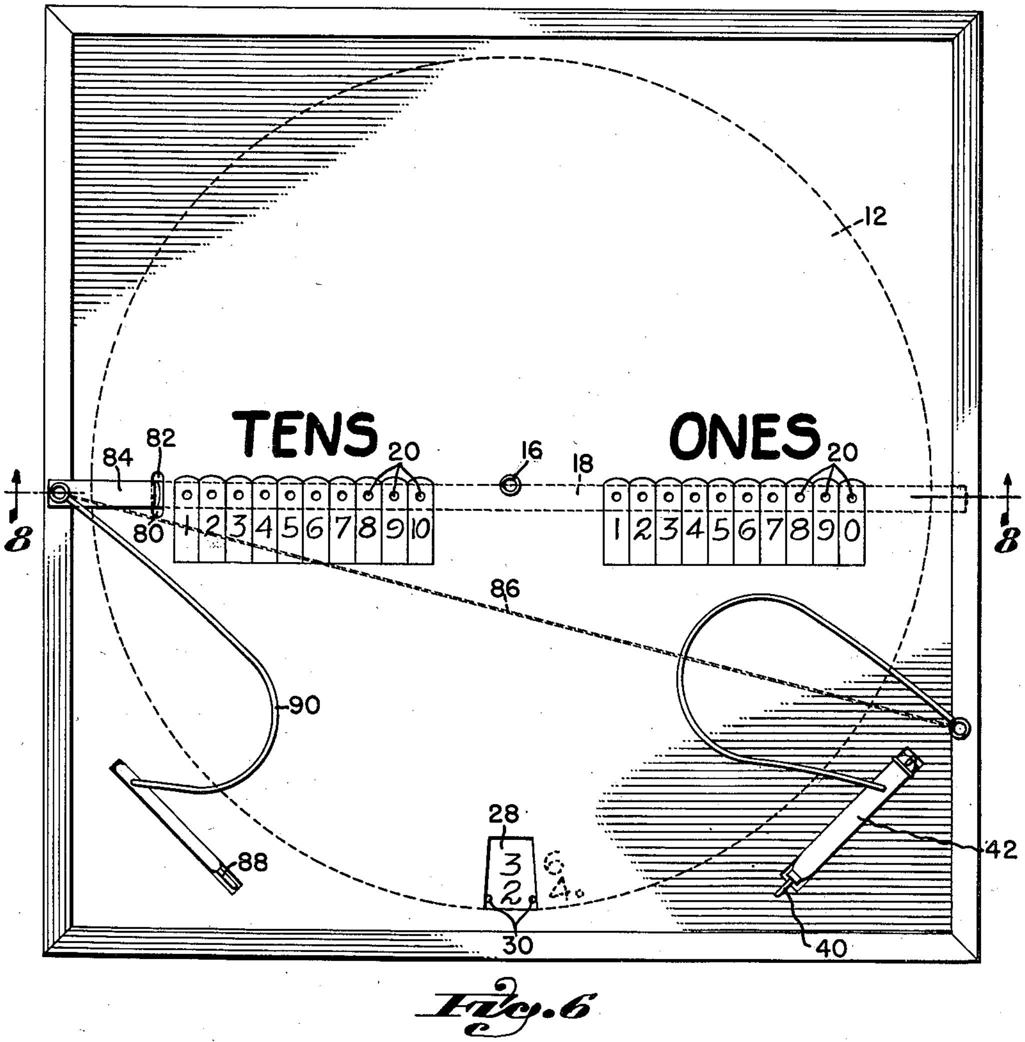
Fig. 6 is a top plan view of my calculator device adapted for indicating the product of two digits of the rotatable disk.
Figure 7:
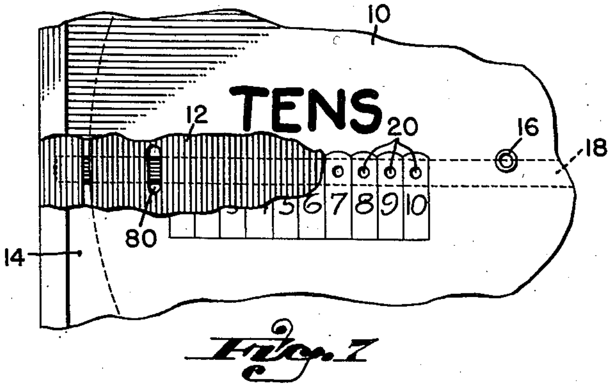
Fig. 7 is a partial view of a portion of Fig. 6 with parts being cut away for clarity of detail and understanding.

A conductor strip 18 is fixedly secured relative to upper panel 12, such as, by means of rivets 21 which secure opposite ends of the strip to lower panel 14. In the preferred embodiment of the invention the conductor strip diametrically spans the under-surface of disk 12, however, as best illustrated in Figs. 3 and 6, said strip is actually disposed entirely on one side of a center line extending through axis 16, about which the disk rotates.

Upper panel 10 is provided with two series of axially aligned, through apertures 20 which are disposed in vertical alignment with and above the conductor strip 18. Each series of apertures 20 is disposed on an opposite side of center 16 of the disk, the one series being denoted by the caption "subtraction," the other series by the caption "addition."

Figure 3:
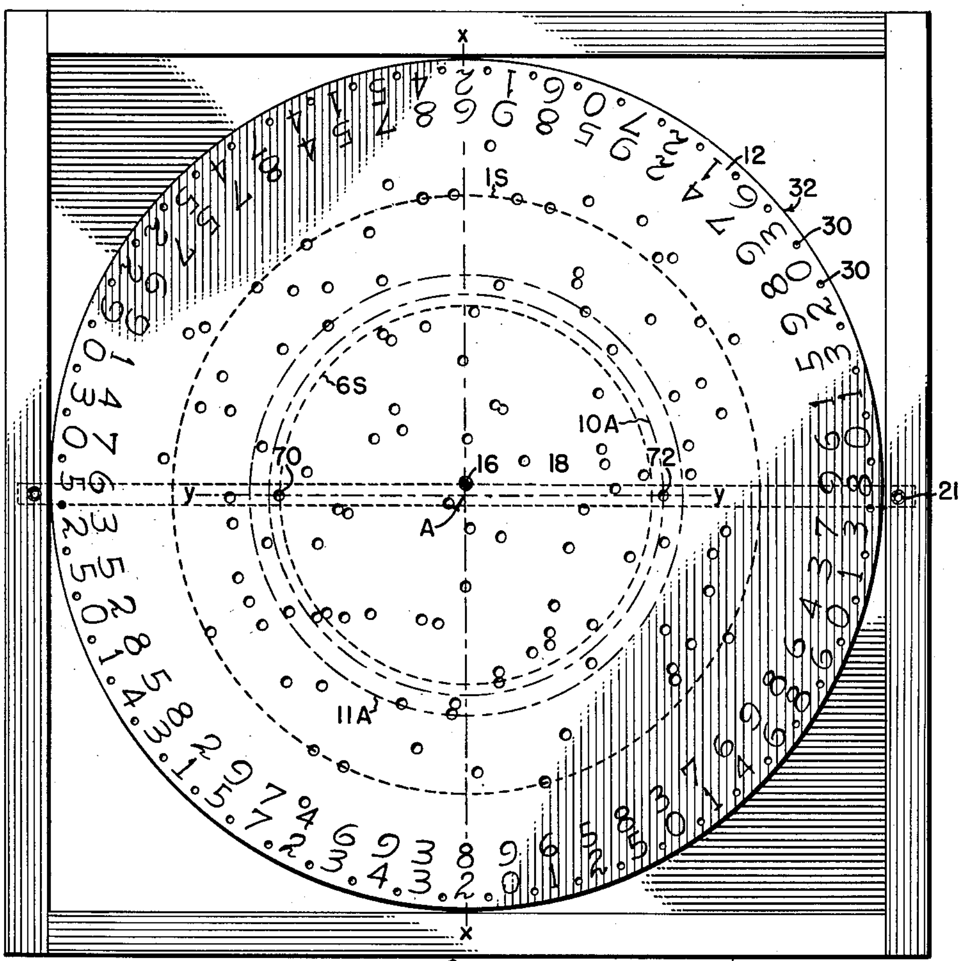
Fig. 3 is a view similar to Fig. 1 but with the upper panel removed.
Figure 4:
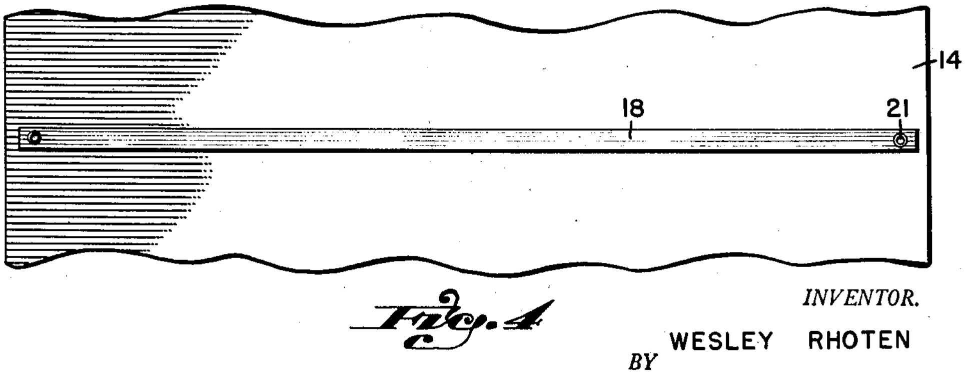
Fig. 4 is a top plan view disclosing the conductor strip which extends beneath the rotatable disk.
Figure 3:
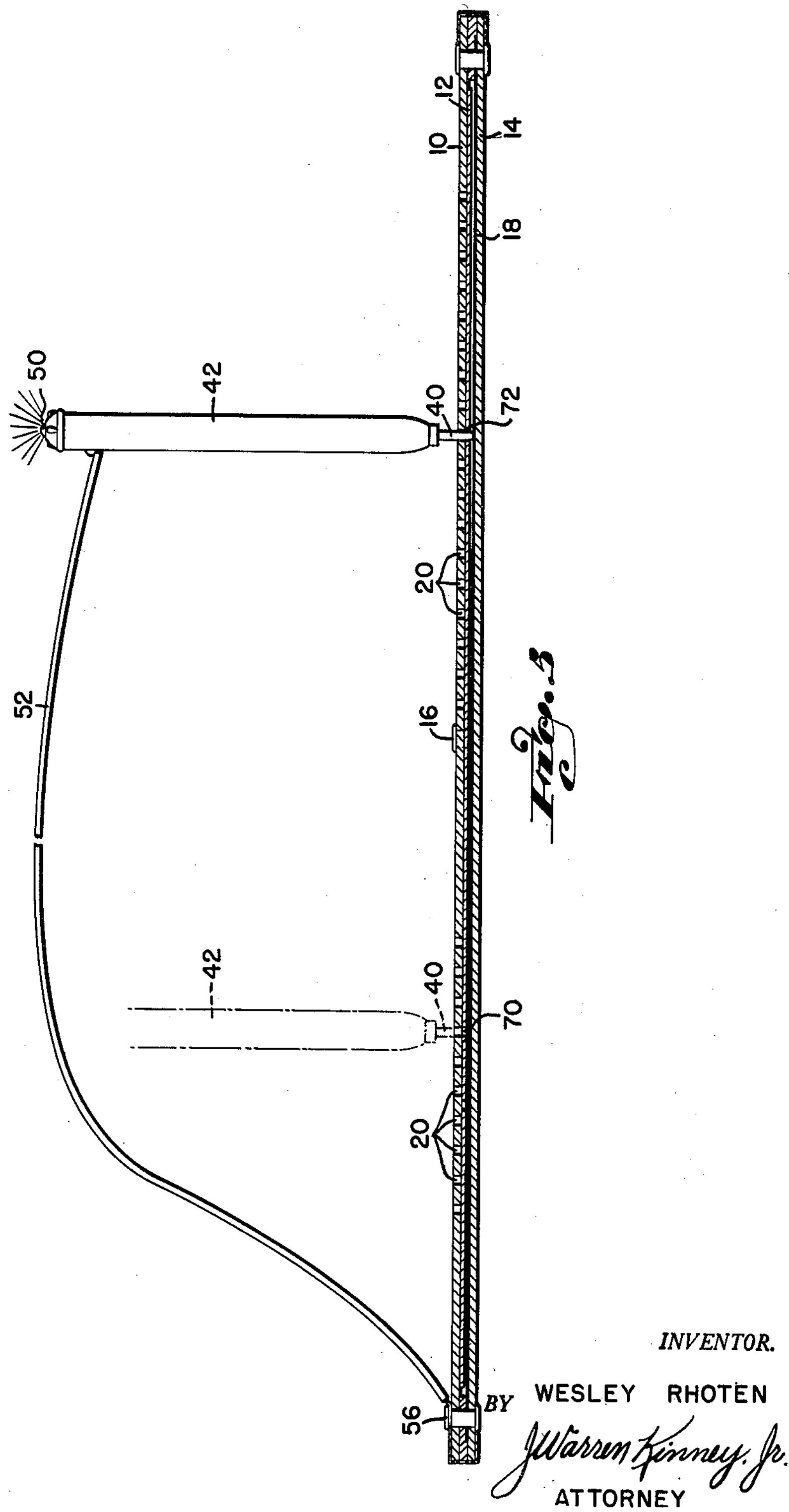

With particular reference now to Figs. 1, 3 and 5, it will be noted that disk 12 is provided with a plurality of pairs of indicia, numerals or digits wherein each pair comprise a group. The pair of numbers which comprise each group are contained within a different segment of the disk.

The width of each segment-group is determined by the spacing between adjacent apertures 30 provided adjacent the free outer edge 32 of the disk. The purpose of apertures 30 is to facilitate rotation of disk 12 by means of conductor probe 40, for thereby selectively and accurately aligning various groups of indicia within window opening 28 provided through upper panel 10.

Figure 2:
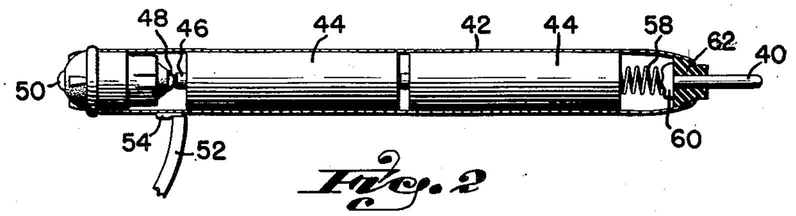
Fig. 2 is a sectional view taken on line 2—2 of Fig. 1 for illustrating the structural details of the combination conductor probe and indicator means.

As best illustrated in Fig. 2, the numeral 42 denotes a housing containing a pair of dry cells 44, one contact 46 of which engages one end 48 of an indicator element such as, by way of example, an incandescent light bulb 50. The other side of the circuit to the light bulb may be completed through housing 42 to conductor 52 suitably secured, such as by way of soldering, or the like, to housing 44, as 54. Conductor 52 is secured in series circuit to one end of conductor strip 14 as at 56. The other side of batteries 44 is connected via spring 58 to contact element 60 of the inner end of conductor probe 40, it being noted that said probe is insulated from housing 42 by means of insulator bushing 62.

With reference now to Fig. 3, it will be noted that the apertures 70 and 72 will be disposed in vertical alignment with apertures 20 of the upper panel, and in particular aperture 70 of the disk will be aligned with aperture 29 of the subtraction table corresponding to the numeral 6 thereof. Likewise disk aperture 72 will be disposed in vertical alignment with aperture 20 of the addition side of the upper panel which corresponds to the numeral 10 in those instances wherein the numeral 8 appears above the numeral 2 in window 28, as illustrated, it being noted that the difference between 8 and 2 is 6, and that the sum thereof is 10.

Insertion of conductor probe 40 through subtraction aperture 20, which corresponds to No. 6, will permit it to project through disk aperture 70 to engage and thereby complete and electrical circuit with conductor strip 18.

It will be noted that insertion of conductor probe 40 into any of the other apertures 20 of the "subtraction" side of the device will result in the tip of the probe engaging the upper surface of the disk 12, thereby precluding contact of the probe with strip 18 and completion of an electrical circuit to the indicator device.

Insertion of conductor probe 40 into aperture 20 of the "addition" side corresponding to the numeral 10 will result in completion of an electrical circuit as the probe passes through disk aperture 72 to engage strip 18.

It will be understood that for each set of two numerals comprising a group there will be but one disk aperture, and only one disk aperture, disposed in vertical alignment with a corresponding aperture of each series of apertures in the upper panel for indicating the difference and the sum of the two numerals appearing in window 28.

With particular reference now to Fig. 3, it will be noted that the apertures in disk 12 are not concentric about or with respect to axis 16 about which the disk rotates. Instead, these apertures are concentric about or with center A located on diameter *x—x* and chord *y—y* at right angles thereto. Chord *y—y* is spaced from axis 16 by an amount whereby to locate the apertures in the disk in eccentric or off-center relationship therewith. Excellent results have been spaced 3/16 inch from center 16 in those instances when the diameter of the disk approximates 12 inches.

The various apertures for "subtraction" problems are on different diameters, with respect to center A, than are the diameters of the apertures for "addition" problems. By way of example, those disk apertures on dashed line 1S are on a radius coinciding with the location of the aperture 20 above the No. 1 of the "subtraction" series, and those apertures on broken line 6S are on a radius coincident with aperture of No. 6 of said series, etc.

Those disk apertures on dash lines 10A and 11A are respectively on radii coincident with the apertures 20 in the "addition" series marked 8 and 11, etc.

In the preferred embodiment of the invention, the radii of the center lines of the "subtraction" apertures are out of phase with the radii of the center lines of the "addition" apertures for precluding misalignment of the apertures of the disk with apertures of upper panel 10.

As clearly evident from Fig. 3, the disk apertures 70 and 72 are disposed on an axis *y—y* at right angles with a line extending through center A and bisecting the particular segment in which the group of two numbers, whose difference is indicated by aperture 70 and those sum is indicated by aperture 72, is located.

With reference now to Figs. 6 through 9, it will be noted that disk 12 has been provided with a plurality of elongate slots 80 on a common radius, in addition to a plurality of "product" apertures. The elongate slots 80 are adapted to be selectively disposed in vertical alignment or registry with an elongate slot 82 provided in the upper panel immediately above conductor strip 18. A contact arm 84 of resilient, conductive material is secured in series circuit, via conductor 86, to housing 42 of the conductor-probe-indicator element. Arm 84 terminates in a downturned lip 83 dimensioned to be loosely received within and project downwardly through slot 82. A conductor probe 88 is connected in series circuit via conductor 90 to arm 84.

Figure 8:
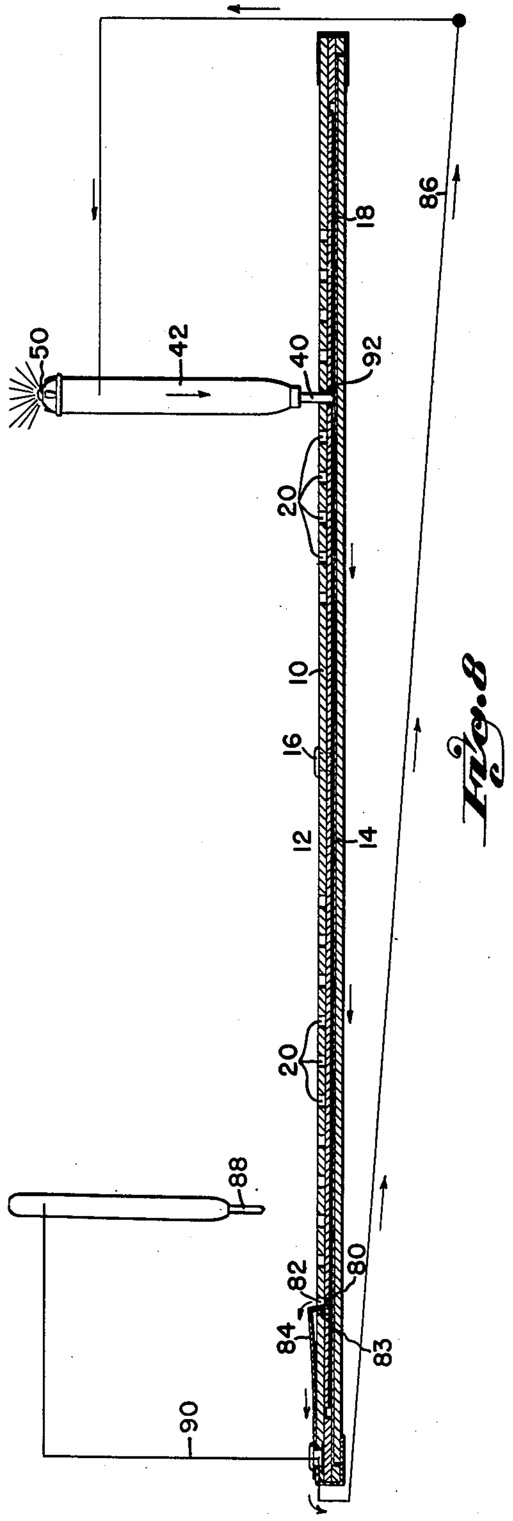
Fig. 8 is a sectional view taken on line 8—8 of Fig. 6 showing the relationship of various parts of the calculator in those instances wherein the total of the two digits being multiplied is less than 10.

As illustrated in Fig. 6, the numeral 3 is a multiplicand, the numeral 2 the multiplier, and the product is 6, a number less than 10. This product will therefore be indicated in the series of apertures beneath the notation "ones" when conductor probe 40 is inserted in that aperture 20 which corresponds to the numeral 6 under the heading "ones." As best illustrated in Fig. 8, one of the slots 80 of the rotatable disk will be disposed in registry with slot 82, thereby permitting lip 83 to contact conductor strip 18. The disk aperture 92 will be disposed in vertical alignment with that No. 6 of the "ones" aperture 20 whereby probe 40 will contact and make electrical contact with conductor strip 18, thereby completing an electrical circuit to the indicator 50.

Figure 9:
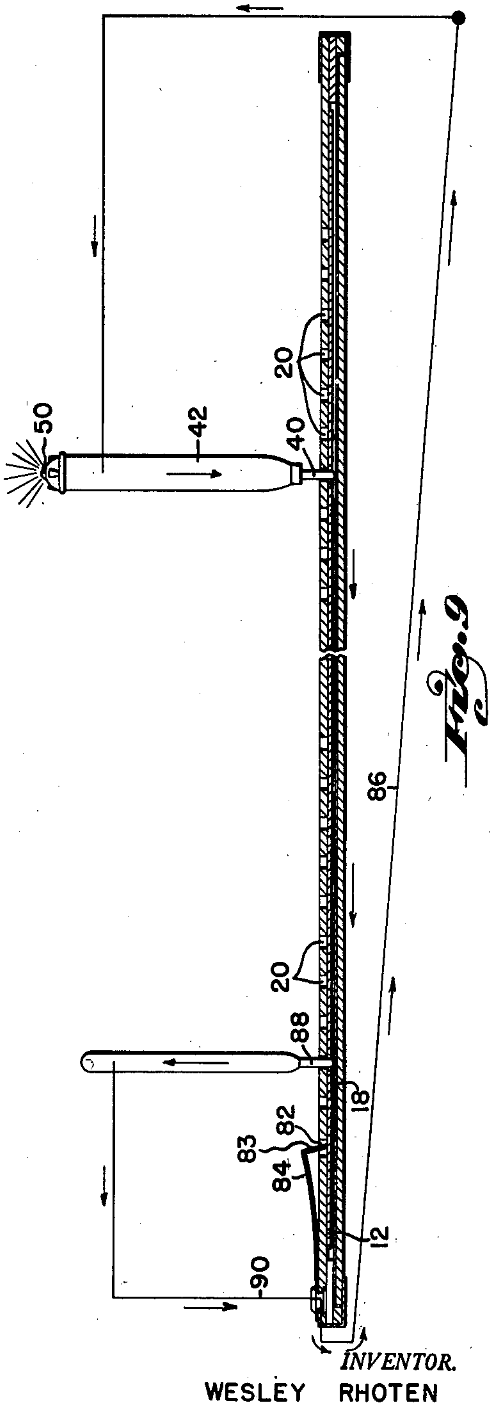
Fig. 9 is a view similar to Fig. 8 illustrating the relationship of parts in those instances wherein the product of the numbers being multiplied is greater than 9.

In those instances wherein the product of the numbers appearing in window 28 are greater than 10, both probes must be utilized for completing the electrical circuit. As best illustrated in Fig. 9, it will be noted that probe 88 has been inserted in that opening 20 of the "tens" series corresponding to the number 2 thereof, and that probe 40 has been inserted through aperture 20 of the "ones" series which corresponds to the numeral 4. It will likewise be noted that the lip 83 of arm 84 engages disk 12 and has been elevated out of contacting relationship with conductor strip 18. The electrical circuit to indicator 50 is through probe 40 to contact strip 18, via aligned apertures in the upper panel and disk, through strip 18 to probe 88 which it engages through aligned apertures of the "tens" series in the upper panel and disk, through conductors 90 and 86 back to housing 42.

From the foregoing it will be noted that I have thus provided simple, yet highly effective means for indicating the sum, difference or product of various numerals.

What is claimed is:

1. A calculator for simultaneously indicating the sum and difference of various combinations of numerals, which device comprises a panel, a disk rotatably secured thereto, an elongate conductor strip spanning that face of the disk remote from the panel, said panel provided with two series of axially aligned, laterally spaced apertures disposed in vertical alignment with said conductor strip and on opposite sides of and below the center of rotation of the disk, said panel provided with a window opening for exposing a segment of the disk adjacent its outer periphery, said window opening located on an axis at substantial right angles with the center line of the panel apertures, said disk provided with a series of combinations of numerals wherein the numerals of each combination are wholly contained within a segment of the disk, said disk provided with a plurality of apertures disposed about a common center coincident with the intersection of the axis of the panel window opening with the center line of the panel apertures, each of said disk apertures correlated with a particular combination of numerals and with one of the apertures of said panel for simultaneously disposing corresponding apertures of each series of the panel and disk in vertical alignment and in phase relationship with a particular combination of numerals exposed through the window opening of the panel for indicating on one series of panel apertures the sum of said combination of numerals and on the other series of panel apertures the difference between said combination of numerals, a probe, electrically actuated indicator means including a source of electrical energy in series circuit with said conductor strip and probe, said probe dimensioned to be inserted through the vertically aligned apertures of said panel and disk for completing an electrical circuit with said conductor strip.

2. A calculator for indicating the product of various combinations of numerals, which device comprises a panel, a disk rotatably secured thereto, an elongate conductor strip spanning that face of the disk remote from the panel, said panel provided with two series of axially aligned, laterally spaced apertures disposed in vertical alignment with said conductor strip and on opposite sides of and below the center of rotation of the disk, those apertures to the left of center indicating "tens" and those apertures to the right of center indicating "ones" of the product of numerals to be multiplied, said panel also provided with a slot in vertical alignment with the conductor strip and with a window opening for exposing a segment of the disk adjacent its outer periphery, said window opening located on an axis at substantial right angles with the center line of the panel apertures, said disk provided with a series of combinations of numerals wherein the numerals of each combination are wholly contained within a segment of the disk, said disk provided with a plurality of apertures disposed about a common center coincident with the intersection of the axis of the panel window opening with the center line of the panel apertures, each of said disk apertures correlated with a particular combination of numerals and with a particuular aperture of the "tens" or "ones" series for disposing corresponding aptreures of each series of the panel and disk in vertical alignment and in phase relationship with a particular combination of numerals exposed through the window opening of the panel for indicating the product of said combination of numerals, said disk provided with a plurality of slots adapted to be disposed in registry with the slot of said panel only when the product of the numerals of a particular combination is less than ten, a conductor arm including a portion seated in the panel slot for engaging and riding upon the disk and for entering the disk slots in registry with the panel slot for contacting the conductor strip, a first probe in series circuit with said conductor arm, a second probe in series circuit with said conductor arm, electrically actuated indicator means including a source of electrical energy in series circuit with said conductor arm and said second probe, said probes dimensioned to be inserted through the vertically aligned apertures of said panel and disk for completing an electrical circuit with said conductor strip.

References Cited in the file of this patent

UNITED STATES PATENTS

| | | |
|---|---|---|
| 2,507,215 | Miltenberg et al. | May 9, 1950 |
| 2,507,223 | Rosenfeld | May 9, 1950 |
| 2,546,666 | Fleischer | Mar. 27, 1951 |
| 2,591,327 | Witter et al. | Apr. 1, 1952 |
| 2,663,091 | Brown | Dec. 22, 1953 |